United States Patent
Kruglick

(10) Patent No.: US 9,396,564 B2
(45) Date of Patent: Jul. 19, 2016

(54) ATLAS GENERATION BASED ON CLIENT VIDEO CONFIGURATION

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/413,414

(22) PCT Filed: Mar. 26, 2014

(86) PCT No.: PCT/US2014/031890
§ 371 (c)(1),
(2) Date: Jan. 7, 2015

(87) PCT Pub. No.: WO2015/147815
PCT Pub. Date: Oct. 1, 2015

(65) Prior Publication Data
US 2015/0310642 A1    Oct. 29, 2015

(51) Int. Cl.
*G06T 11/20* (2006.01)
*G06F 15/16* (2006.01)
*G06T 1/60* (2006.01)
*G09G 5/00* (2006.01)
(Continued)

(52) U.S. Cl.
CPC .............. *G06T 11/20* (2013.01); *G06F 15/16* (2013.01); *G06T 1/60* (2013.01); *G09G 5/006* (2013.01); *H04N 5/44* (2013.01); *H04N 21/235* (2013.01); *H04N 21/25825* (2013.01); *H04N 21/25833* (2013.01); *H04N 21/654* (2013.01); *H04N 21/6581* (2013.01); *H04N 21/6582* (2013.01); *H04N 21/8153* (2013.01); *G09G 2370/022* (2013.01)

(58) Field of Classification Search
CPC ........ G06T 11/20; G06T 1/60; H04N 21/654; H04N 21/6581; H04N 21/25833; H04N 21/25825; H04N 21/8153; H04N 21/235; H04N 21/6582; H04N 5/44; G09G 5/006; G09G 2370/022; G06F 15/16
See application file for complete search history.

(56) References Cited

U.S. PATENT DOCUMENTS 8,385,669 B2    2/2013 Gerhard et al.
2011/0316854 A1    12/2011 Vandrovec
(Continued)

OTHER PUBLICATIONS

"Automatic Projection Tiles," accessed at http://web.archive.org/web/20130905222103/http://www.jasondavies.com/maps/tile/, accessed on Oct. 8, 2014, p. 1.
(Continued)

Primary Examiner — Martin Mushambo
(74) Attorney, Agent, or Firm — Turk IP Law, LLC

(57) ABSTRACT

Technologies may be provided related to customization and delivery of atlases matched to hardware of a client device in real-time. In some examples, a system according to embodiments may perform an assessment of the target hardware, generate atlases matched to the target hardware, and modify application code to reference graphic assets in their new locations in the modified atlases. An increase in speed of application loading, an increase in speed of resource delivery, a reduction of memory consumption on the client device, and/or an increase in the client device frame rate may be achieved by matching the atlases to attributes of the video hardware.

20 Claims, 7 Drawing Sheets

(51) Int. Cl.
  *H04N 5/44* (2011.01)
  *H04N 21/235* (2011.01)
  *H04N 21/258* (2011.01)
  *H04N 21/654* (2011.01)
  *H04N 21/658* (2011.01)
  *H04N 21/81* (2011.01)

(56) References Cited

U.S. PATENT DOCUMENTS

| | | | |
|---|---|---|---|
| 2012/0089933 A1 | 4/2012 | Garand et al. | |
| 2012/0151373 A1 | 6/2012 | Kominac et al. | |
| 2012/0208636 A1 | 8/2012 | Feige | |
| 2013/0036193 A1* | 2/2013 | Padmanabhan | G06F 17/30876 709/217 |
| 2013/0063463 A1* | 3/2013 | Clark | G09G 5/00 345/582 |
| 2013/0321456 A1* | 12/2013 | Hultquist | G01C 21/3667 345/629 |

OTHER PUBLICATIONS

"Device fingerprint," accessed at http://web.archive.org/web/20140226113034/http://en.wikipedia.org/wiki/Device_fingerprint, modified on Jan. 27, 2014, pp. 5.

"Dynamic Texture Atlas and Bitmap Font Generator (Starling framework Extension)," accessed at http://web.archive.org/web/20130604064120/https://github.com/emibap/Dynamic-Texture-Atlas-Generator, accessed on Oct. 8, 2014, pp. 4.

"Dynamic Texture Atlas Generator—Starling extension," accessed at http://web.archive.org/web/20131004073014/http://forum.starling-framework.org/topic/dynamic-texture-atlas-generator-starling-extension, accessed on Oct. 8, 2014, pp. 7.

"Google I/O 2012—GRITS: PvP Gaming with HTML5," Accessed at http://www.youtube.com/watch?v=Prkyd5n0P7k, Published on Jun. 27, 2012, pp. 3.

"Media Queries," accessed at http://web.archive.org/web/20140222062601/http://www.w3.org/TR/css3-mediaqueries/, posted on Jun. 19, 2012, pp. 19.

"Quadtree," accessed at http://web.archive.org/web/20140310162041/http://en.wikipedia.org/wiki/Quadtree, modified on Jan. 24, 2014, pp. 9.

"The developer's guide to the HTML5 APIs," accessed at http://web.archive.org/web/20130922061757/http://www.creativebloq.com/html5/developer-s-guide-html5-apis-1122923, accessed on Oct. 8, 2014, pp. 14.

Alex, "How to get real window width," accessed at http://web.archive.org/web/20131215062719/http://mauzon.com/how-to-get-real-window-width/comment-page-1/, posted on Jan. 18, 2005, pp. 5.

Angwin, J., and Valentino-Devries, J., "Race Is on to 'Fingerprint' Phones, PCs," accessed at http://web.archive.org/web/20131105143848/http://online.wsj.com/news/articles/SB10001424052748704679204575646704100959546, posted on Nov. 30, 2010, pp. 6.

Coyier, C., "CSS Sprites: What They Are, Why They're Cool, and How to Use Them," accessed at http://web.archive.org/web/20140209064559/http://css-tricks.com/css-sprites/, posted on Oct. 24, 2009, pp. 42.

Davenport, T., "Installable Web Apps Will Be the Next Tech Battleground," accessed on http://www.technologyreview.com/view/508741/installable-web-apps-will-be-the-next-tech-battleground/, posted on Dec. 13, 2012, pp. 3.

Gobbetti, E., et al., "Adaptive Quad Patches: an Adaptive Regular Structure for Web Distribution and Adaptive Rendering of 3D Models," Web3D '12 Proceedings of the 17th International Conference on 3D Web Technology, pp. 9-16, 2012.

Kuchinskas, S., "Device Fingerprinting Firm BlueCava Makes Tracking Opt-Outs Easier," accessed at http://web.archive.org/web/20131008040205/http://www.clickz.com/clickz/news/2142423/device-fingerprinting-firm-bluecava-makes-tracking-opt-outs-easier, posted on Jan. 31, 2012, pp. 7.

Lambert, P., "The Firefox OS marketplace is brilliant," accessed at http://web.archive.org/web/20130722081015/http://dendory.net/?b=50ff42f1, posted on Jan. 22, 2013, pp. 2.

Marcotte, E., "Responsive Web Design," accessed at http://web.archive.org/web/20140122131925/http://alistapart.com/article/responsive-web-design, posted on May 25, 2010, pp. 9.

Xinze, L., Web-based Sprite Sheet Animator for Sharing Programmatically Usable Animation Metadata, accessed at http://uu.diva-portal.org/smash/record.jsf?pid=diva2%3A612988&dswid=2316, accessed on Oct. 8, 2014, pp. 3.

International Search Report and Written Opinion for PCT/US14/31890 filed on Mar. 26, 2014 and mailed on Sep. 4, 2014.

* cited by examiner

ATLAS GENERATION BASED ON CLIENT VIDEO CONFIGURATION

CROSS-REFERENCE TO RELATED APPLICATION

This application is the National Stage filing under 35 U.S.C. §371 of PCT Application Ser. No. PCT/US14/31890 filed on Mar. 26, 2014. The PCT application is hereby incorporated by reference in its entirety.

BACKGROUND

Unless otherwise indicated herein, the materials described in a background section are not prior art to the claims in the present application and are not admitted to be prior art by inclusion in the background section.

Popularity of online content consumption and locally stored content has increased along with the advance of networking and data processing technologies. Modern content providers may present complex image quality. Content providers may provide high quality content for rendering at a client device. Processing, transmission, and rendering of the high quality content may necessitate increased hardware resources including processing, network, and storage resources at the content provider and the client.

Hypertext markup language (HTML) may be used in content production for consumption in modern platforms. Content, such as a graphics, may be formatted with HTML and provided to a client device through an atlas. The atlas is a partitioned graphic formatted for consumption by the client device. Processing of the atlas by the client device is managed by video hardware of the client device. A typical portable client device may limit a useful size of the atlas, for example, to a twice a display area of the portable client device. The portable client device may limit the atlas size to reduce needed memory.

SUMMARY

The present disclosure generally describes technologies including methods, apparatus, systems, devices, and/or computer program products related to generation of an atlas based on a video configuration of a client.

According to some examples, methods to generate one or more atlases based on a video configuration of a client may be described. An example method may include receiving a request for graphic assets through a content application, determining the video configuration of the client, generating the atlases from the graphic assets based on the video configuration, modifying a code of the content application that includes references to the graphic assets, based on the atlases, and transmitting the atlases to the client.

According to other examples, a system to generate one or more atlases based on a video configuration of a client may be described. The system may include a first server communicatively coupled to a second server. The first server may be configured to receive a request for graphic assets, from the client and transmit the request to the second server. The second server may be configured to receive the request, determine the video configuration of the client, generate the atlases from a master atlas that is in a decomposed form that includes the graphic assets, based on the video configuration, retrieve a code of a content application of the first server that includes references to the graphic assets, modify the code based on the atlases, and transmit the atlases and the code to the first server. The first server may be further configured to receive the code and the atlases, provide the content application that includes the code to the client, and transmit the atlases to the client.

According to further examples, a system may be described. The system may include a client device that includes a video module and a communication module and a server configured to communicate with the client device. The server may include a memory configured to store instructions associated with generation of one or more atlases based on a video configuration of the client device and a processor coupled to the memory. The processor may be configured to receive a request for graphic assets, from the client, determine the video configuration of the client, determine a size of each one of the atlases through a match operation that determines the size from the video configuration, generate the atlases from a master atlas that is in a decomposed form that includes the graphic assets, modify a code of a content application that includes references to the graphic assets, based on the atlases, and transmit the atlases to the client.

According to some examples, a computer-readable storage medium may store instructions to generate one or more atlases based on a video configuration of a client. The instructions, in response to execution by a processor, may cause the processor to receive a request for graphic assets, from the client, determine the video configuration of the client, determine a size of each one of the atlases through a match operation that determines the size from the video configuration, generate the atlases from a master atlas that is in a decomposed form that stores the graphic assets, modify a code of a content application that includes references to the graphic assets, based on the atlases, and transmit the atlases to the client.

The foregoing summary is illustrative and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict several embodiments in accordance with the disclosure and may not to be considered limiting of its scope, the disclosure will be described with additional specificity and detail through use of the accompanying drawings, in which:

DETAILED DESCRIPTION

Figure 1:
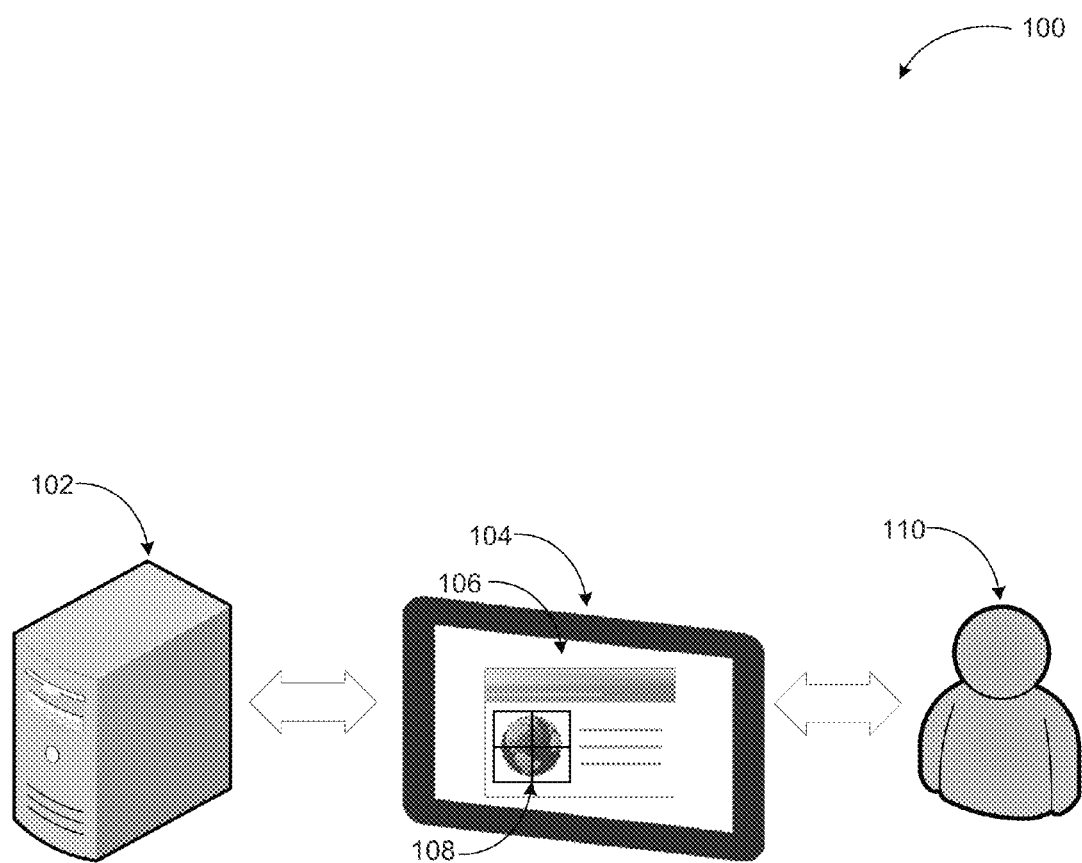
FIG. 1 illustrates an example high-level diagram of a system configured to generate one or more atlases based on a video configuration of a client.

In the following detailed description, reference is made to the accompanying drawings, which form a part hereof. In the drawings, similar symbols may identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, may be arranged, substituted, combined, separated, and designed in a wide variety of different configurations, all of which are explicitly contemplated herein.

The disclosure is generally drawn, inter alia, to methods, apparatus, systems, devices, and/or computer program products related to generation of one or more atlases based on a video configuration of a client device.

Briefly stated, technologies may be provided related to customization and delivery of atlases matched to hardware of a client device in real-time. In some examples, a system according to embodiments may perform an assessment of the target hardware, generate atlases matched to the target hardware, and modify application code to reference graphic assets in their new locations in the modified atlases. An increase in speed of application loading, an increase in speed of resource delivery, a reduction of memory consumption on the client device, and/or an increase in the client device frame rate may be achieved by matching the atlases to attributes of the video hardware.

"Atlasing," as used herein, may relate to combining or combination of graphic assets into one or more data structures storing the graphic assets. Examples of the graphic assets may include sprites for animation, user interface (UI) textures that are not animated, glyphs for font-processing, among others. Atlasing may be used to accelerate the performance of three-dimensional content, where the performance may be slowed down when referencing new textures during the rasterization stages of a three-dimensional pipeline. Rasterization may include taking graphic assets described in a vector graphical format and converting the graphic assets into a raster image for output on a display device or for storage in a bitmap file format. The raster image or the bitmap file may be a matrix data structure representing a grid of pixels viewable by the display.

An "atlas," as used herein, may refer to one or more data structures storing graphic assets used in real-time computer graphics. An atlas may include one or more sub-atlases that correspond to sub data structures. In some embodiments, a foreground atlas may contain shapes and characters, which may be distinct from a background atlas (e.g., a background atlas used for gaming). In differing embodiments, the foreground atlas and the background atlas may be placed together for rendition of one or more graphic assets on a client device.

In some examples, the atlases may be automatically generated by programs that attempt to optimally fit the graphic assets of variable sizes and transparency into a graphic asset. In some examples, programs may be available to take three-dimensional rendered graphical assets and generate canonical two-dimensional views, where the views may be put into atlases.

A "sprite," as used herein, may be a two-dimensional graphic or a two-dimensional animation that is integrated into a graphic asset. Sprites may involve a method of integrating unrelated bitmaps so that the unrelated bitmaps may appear to be part of the bitmap on a screen. Sprites may also include flat graphic assets integrated into three-dimensional scenes. Two suitable techniques may be used, for example, to render the sprites by software, where the technique depends on the display hardware characteristics. In one of the techniques, binary image masks may be used for systems with bitmapped video frame buffers. In the other technique, transparent color may be used for systems with indexed color display.

A "sprite sheet," as used herein, may refer to the combination of the graphic assets or icons into a container, where the container may represent the sprite sheet. The sprite sheet may be similar to an atlas. However, the sprite sheet may merely contain sprites. The sprite sheet may be used to reduce the number of requests a client web browser makes to the web application server. Cascading Style Sheets (CSS) sprites may be used in web design to improve performance by implementing the sprite sheet and selecting the graphic assets to show on the rendered page through use of CSS. Advantages to use of CSS sprites may include enhanced performance and automatic preload of the graphic assets. The performance improvements may include reduced overhead due to fewer Hypertext Transfer Protocol (HTTP) requests, as well.

"Media queries," as disclosed herein, may allow a service provider to inspect the physical characteristics of the client device rendition of the content, where the returned message may be an Extensible Markup Language (XML) string. In some embodiments, the XML string may include dimensions in forms similar to, "height: 1080 px width: 1920 px." The media queries may be implemented by a CSS3 module. CSS3 is the latest version of CSS. The CSS3 module may allow content rendition to adapt to conditions (e.g., screen resolution) of the client device. Adapting to conditions of the client device may be beneficial, as a number devices implement a number screen sizes (e.g., a smartphone screen size compared to a high definition television screen size).

A "texture atlas," as used herein, may relate to a container used in real-time computer graphics. The container may include smaller graphic assets. The smaller graphic assets may be referenced independently by location in an atlas. The smaller graphic assets may include textures of a three-dimensional object. In an application where many small textures may be used frequently, storage of the textures in a texture atlas may be beneficial. Benefits to use a texture atlas with a markup language may include a decrease in HTTP loading times on the client device, reduced HTTP requests from the client web browser, reduced client web browser runtime overhead, reduced graphics processing unit (GPU) overhead on the client device, and reduced memory footprint on the client device. Creating a texture atlas may involve bin packing, which may include a non-deterministic polynomial-time (NP) level complexity.

A "graphic asset," as used herein, may be any computer-generated graphic and may include a raster image or a vector image. The raster image may include individual pixels that are separately defined (e.g., in a digital photograph). The vector image may include mathematical formulas or relations are used to draw lines and shapes. The vector image may be interpreted by a viewer to produce the graphic. Using vectors may result in infinitely sharp graphics and may result in smaller file sizes. However, when a vector image is complex, a file size of the vector image may be larger than a file size of an equivalent raster image.

Above examples and definitions are not provided in a limiting sense. Other examples and definitions implementing other schemes and techniques may be used by the embodiments.

FIG. 1 illustrates an example high-level diagram of a system configured to generate one or more atlases based on a video configuration of a client, arranged in accordance with at least some embodiments described herein.

As shown in a diagram 100, a system may include a server 102 providing services such web applications to a client device 104. The client device 104 may be used by a user 110. The client device 104 may also execute a client application 106. The client application 106 may render a content application that includes one or more scripts formatted in a markup language (e.g., HTML5) and one or more graphic assets 108. The markup language may be used to develop one or more webpages, which may be rendered by the client application 106.

An example of the client application 106 may include a browser. The client application 106 may render one or more web applications provided by the server 102. The client device 104 may include a wired device, a wireless device, or a combination device having both a wired connectivity and a wireless connectivity. Examples of the client device 104 may include a tablet, a smartphone, a laptop computer, a desktop computer, among others. In some embodiments, the client device 104 may include a video module and a communication module. The video module may include video hardware to render content that includes the graphic assets 108. The communication module may include communication hardware to establish one or communication sessions with other devices. In addition, a computing platform (e.g., OS platform) of the server 102 may host a markup language application programming interface (API) (e.g., HTML5 API) to provide a native level access and an ability to interact with hardware of the client device 104. In an example scenario, the server 102 may use the markup language API to query the client device 104 to determine a video configuration of a video hardware of the client device 104.

As shown in the diagram 100, the server 102 may host services such as a web application, data storage, data processing, or comparable ones. The server 102 may be a component of a datacenter. The datacenter may employ servers and special purpose devices, such as firewalls, routers, among others.

According to some embodiments, the server 102 may perform an assessment of video hardware on the client device 104. The server 102 may generate one or more atlases matched to the video hardware of the client device 104. The server 102 may modify the content application rendered by the client application 106. The modification may include replacement of references to the graphic assets 108 in the code of the content application with coordinates that designate locations of the graphic assets 108 in one or more atlases. The example configuration described here may result in an increase in frame rates when rendering the atlases and an increase in client-side performance across heterogeneous hardware platforms.

According to other embodiments, the server 102 may reduce a load time associated with rendition of the graphic assets 108. The load time may be reduced by transmitting the graphic assets 108 to the client device 104 as one or more atlases. The server 102 may deliver the atlases to the client device 104 in an order of magnitude faster compared to multiple transmissions necessary to deliver the graphic assets 108. Performance improvements may be realized as a result of reduced number of network requests and transmissions of the graphic assets 108 through one or more atlases compared to a number of network requests and transmissions that match the number of graphic assets 108 when transmitting the graphic assets 108 one at a time.

According to yet other embodiments, CSS sprite sheets may be used by the server 102 to customize a delivery of an atlas of the graphic assets 108, in real-time. The atlas may be configured based on the video hardware of the client device 104. The client application 106 may render the graphic assets 108 stored by the atlas to present the graphic assets 108 to the user 110.

In other embodiments, the atlas may be used in conjunction with the scripts and the markup language. In addition to reduction of a load time, rendering of graphic assets 108 through an atlas may improve a runtime performance. In an example scenario, the server 102 may transmit graphic assets 108 to the client device 104 within a first time period through a network. The server 102 may transmit the graphic assets 108 through the network within a second time period that is an order of magnitude less than the first time period when the server 102 transmits the graphic assets 108 within one or more atlas(es) that causes a reduction in a number of transmissions.

Thus, example embodiments provide a multifaceted approach to use of atlases through additional infrastructure and server processing but providing faster client delivery and sessions in return. Upon determination of the screen size (and/or other video configurations) of a client, a system according to embodiments may provide scalable on demand production of variable size atlases, and delivery and operation of web applications with variable size atlases. On the client side, speed of delivery may be increased, an amount of need memory may be reduced, and/or faster frame rates may be achieved by keeping canvas updates fast across arbitrarily sized devices.

Figure 2A:
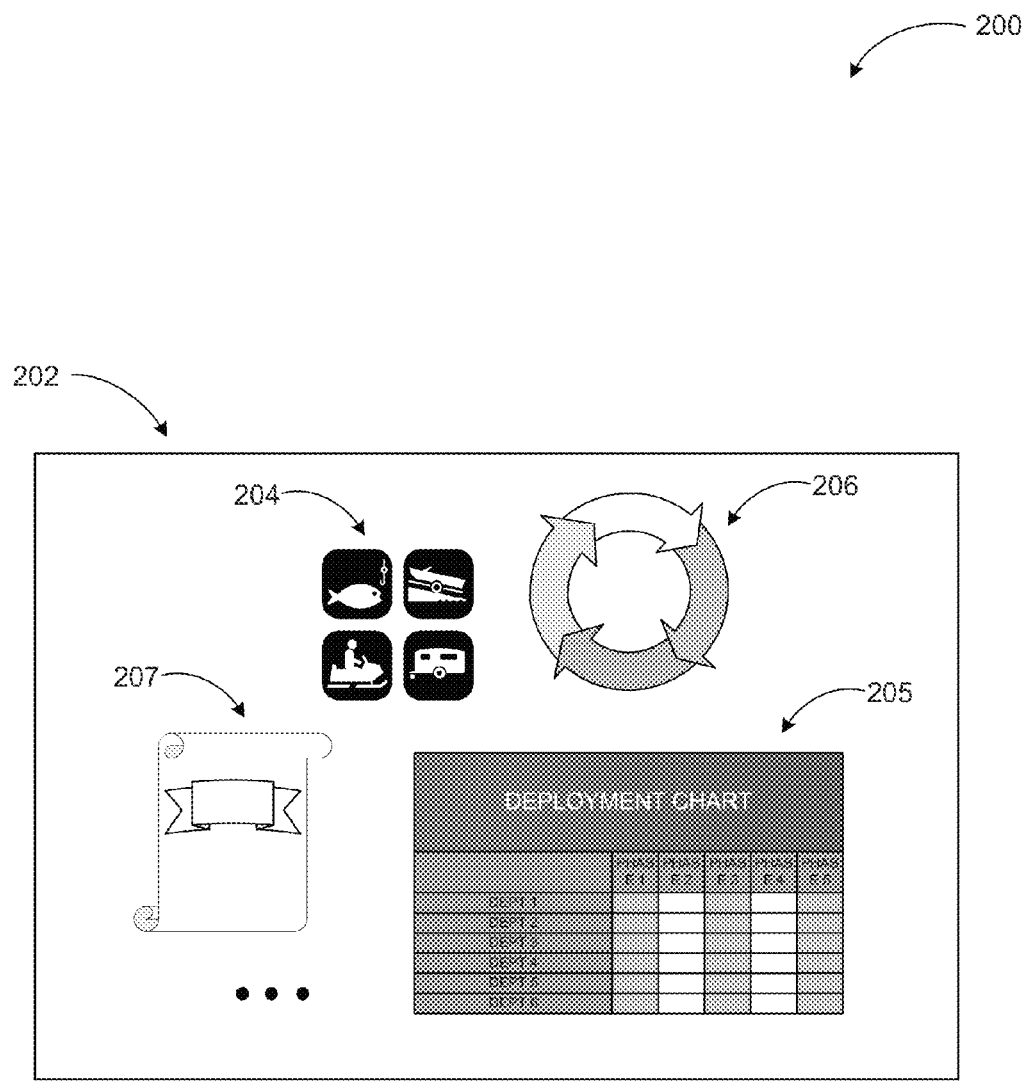
FIGS. 2A and 2B illustrate an example atlas and an example reduction of a background atlas that may be too big for a video configuration of a client.
Figure 2B:
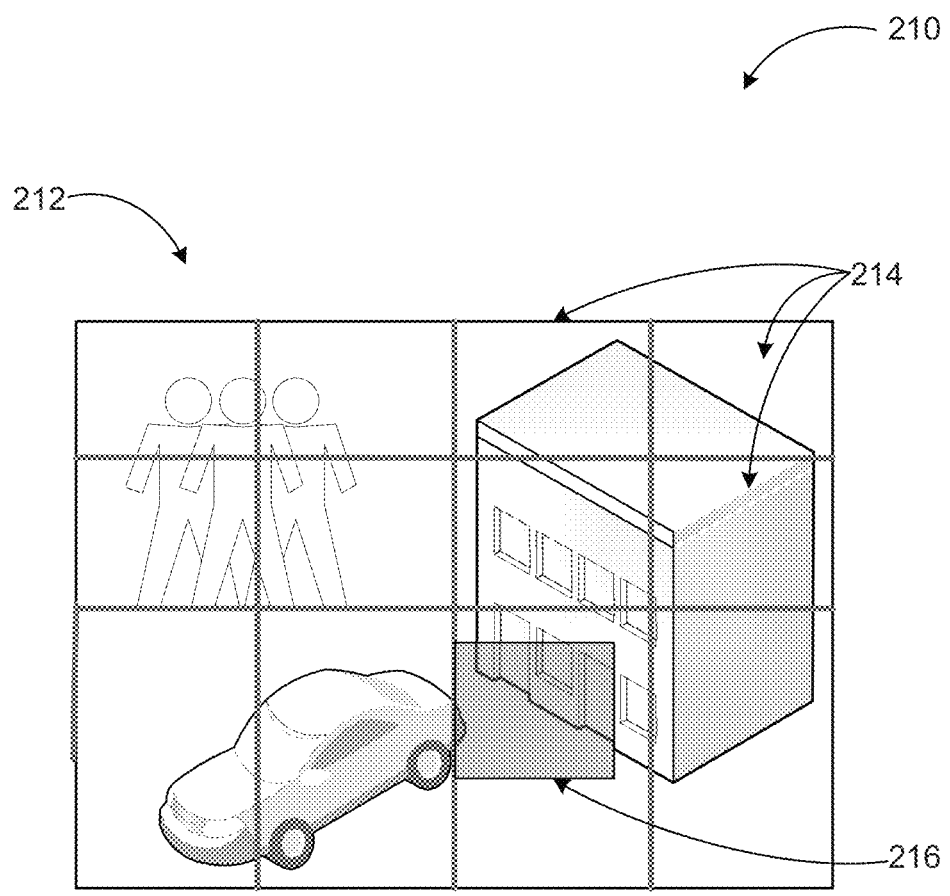

FIGS. 2A and 2B illustrate an example atlas and an example reduction of a background atlas that may be too big for a video configuration of a client, arranged in accordance with at least some embodiments described herein.

As shown in a diagram 200, an atlas 202 may be automatically generated by programs, which may attempt to optimally fit graphics of varying sizes and transparency such as graphics 204, 205, 206, 207, etc. into larger blocks. In some example implementations, the moving shapes and characters may be a single atlas and the background another atlas for games. Yet, other implementations may put the background and characters together and manage them based on different area coordinates in the atlas. Graphical applications may segment by controls or states.

Atlasing may be well handled and hardware accelerated in HTML5 on modern platforms. For example, in graphic atlasing, some or all of the graphics for a web site may be turned into a large single graphic manipulated and placed at the client. Hardware accelerated client-side manipulation and placement of graphics from atlases may be much faster than handling the many requests inherent in getting graphics in multiple pieces already diced for placement.

There may be limits to the scalability of atlases, however. For example, many portable devices may handle hardware acceleration of atlases up to twice the pixel size of the screen due to sizes of graphic processing unit (GPU) memories and buffers. Some desktop computing devices may handle more than twice the pixels of the screen because more powerful graphics cards may handle a range of monitor sizes. Example embodiments are directed to adaptation of content applications such as HTML5 online games for the many possible scenarios of client device capabilities.

When a single atlas (e.g., atlas 212 that contains background graphics for a video game) is too big for a client device, such as shown in a diagram 210, the resulting effect may be animation at only 2 frames per second, for example. Some approaches may address this challenge by reducing the background to map tiles 214, each of which may be 2× the target screen size, increasing the rendering to 60 frames per second, for example. The shaded rectangle 216 may represent the actual play area, but an entire atlas may still be limited to twice the size of the screen no matter what the relation is of that dimension to the play window.

Any client device below the target screen size may see frame rate drop off dramatically. Any client device above the target screen size may experience longer load times and less performance than would have been possible if the client device had the target screen size. Example embodiments may reconcile device graphics memory variety, client device performance, and HTML5 software performance features taking advantage of atlases of varying sizes.

According to some example embodiments, a server may determine a video configuration of a client device to generate an atlas of variable size based on the video configuration. The video configuration may be determined through a query of the client device for the video configuration. The client device may provide the video configuration including a screen size, a video memory size, a graphics processing unit (GPU) capacity, and similar attributes of a video hardware of the client device. Alternatively, the server may query the client device for an identifier associated with a make and a model of the video hardware of the client device. The server may query a data store with the identifier to retrieve a video configuration of the client device. The data store may store and manage video hardware information of a variety of video hardware associated with identifiers of the video hardware.

In an example scenario, the server may determine a memory size of a video hardware of the client device from the video configuration. Alternatively, the server may estimate a memory size of the video hardware of the client device based on a window size of a client application that may be executed on the client device. The memory size may also be estimated based on a screen size of a display unit of the client device. The memory size may be estimated by multiplying the screen size or the window size in pixels with a memory size of an individual pixel. Alternatively, a multiplier such as 2× may be applied to the estimated memory size to include the memory size as an attribute in the video configuration.

For example, the server may generate the atlas 202 from graphic assets (204, 205, 206, and 207). The atlas 202 may be generated through a match operation that evaluates the video configuration to determine a number of the graphic assets 204-207 to combine in the atlas 202. In an example scenario, the server may combine the graphic assets 204-207 in the atlas 202 based on a memory size of a video hardware of a client device. The server may evaluate the memory size and determine a size of the graphic assets 204-207. The server may execute the match operation to keep the size of the graphic assets 204-207 under the memory size of the video hardware of the client device.

Although the examples discussed above use a memory size of a video hardware of the client device to generate the atlas 202, embodiments are not limited to utilizing a memory size of the video hardware to generate the atlas. GPU capacity of the video hardware may be used to generate the atlas 202 from the graphic assets 204-207. In another example scenario, the GPU capacity of the video hardware may be queried from the client device or from the data store that manages video hardware information. The GPU capacity may be used to determine an ability of the video hardware to render the graphic assets 204-207. In response to a determination that the GPU capacity may be sufficient, the server may combine the graphic assets 204-207 within the atlas 202.

According to other embodiments, the server may query the client device for the video configuration of the video hardware of the client device through a script. The client device may return a width and a height of a window of the client application. The window size may not accurately represent a screen size of the client device. However, the window size may be used to approximate the screen size of the client device. An example script to determine an approximated width of a screen size of the client device may include:

```
function getWindowWidth( ) {
    var windowWidth = 0;
    if (typeof(window.innerWidth) == 'number') {
        windowWidth = window.innerWidth;
    }
    else {
        if (document.documentElement &&
            documentdocumentElement.clientWidth)
            {
                windowWidth = document.documentElement.clientWidth;
            }
        else {
            if (document.body && document.body.clientWidth) {
                windowWidth = document.body.clientWidth;
            }
        }
    }
    return windowWidth;
}
```

The server may execute another script that replaces the width variable with the height variable in the script to estimate a height of the screen size of the client device.

Figure 3:
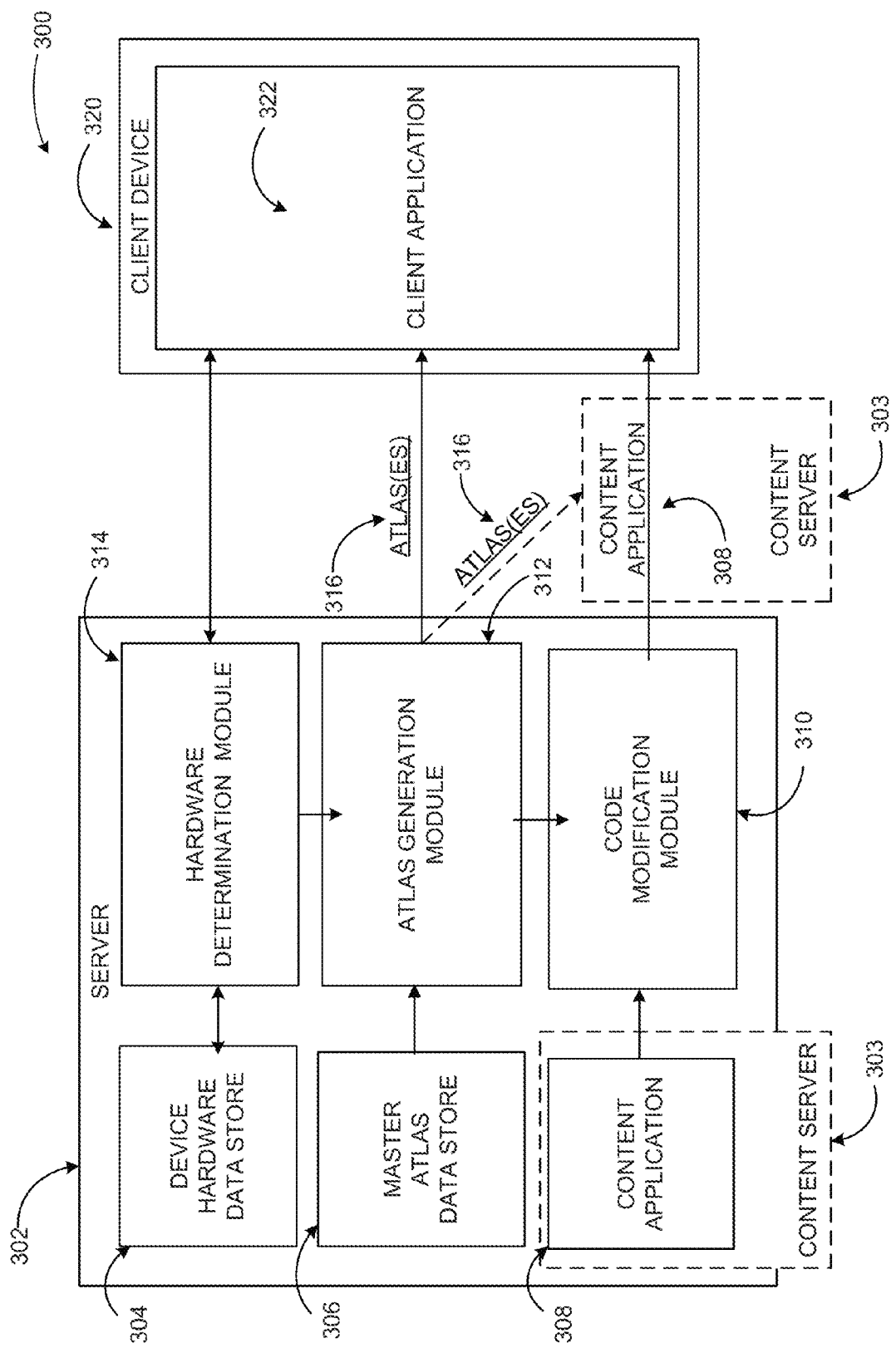
FIG. 3 illustrates an example component diagram of a system configured to generate one or more atlases for a client based on a video configuration of the client.

FIG. 3 illustrates an example component diagram of a system configured to generate one or more atlases for a client based on a video configuration of the client, arranged in accordance with at least some embodiments disclosed herein.

As shown in a diagram 300, a server 302 may generate one or more atlas(es) 316 from graphic assets based on a video configuration of a video hardware of a client device 320. The server 302 may be a web application server providing content, such as the graphic assets to the client device 320. A graphic asset may include a variety of graphical content including but not exclusive to an image, an icon, a two dimensional graphic, a three dimensional graphic, a texture, and similar ones. The server 302 may host a device hardware data store 304 configured to manage video hardware information. The server 302 may also host a master atlas data store 306 configured to manage a master atlas used to generate the atlas(es) 316 or to store pre-generated atlases of varying sizes to supply them as needed. The server 302 may also provide a content application 308 configured to provide services to the client device 320. The services may include presentation of content to the client device 320 such as the graphic assets through the atlas(es) 316.

The server 302 may execute processes associated with generation of the atlas(es) 316 from the graphic assets through modules. The modules may include a hardware determination module 314, an atlas generation module 312, and a code modification module 310. The hardware determination module 314 may be configured to communicate with the client device 320 to determine a video configuration of the client device 320. The atlas generation module 312 may be configured to transmit the graphic assets requested by the client device 320 through use of the atlas(es) 316 based on the video configuration determined by the hardware determination module 314. The atlas generation module 312 may be configured to determine the graphic assets to combine in the atlas(es) 316 based on the video configuration. The video configuration may include a memory size of the video hardware of the client device 320 or a GPU capacity of the video hardware of the client device 320. The atlas generation module 312 may be configured to evaluate the video configuration to an attribute of the graphic assets such as a total size of the graphic assets.

The code modification module 310 may replace references to the graphic assets in a code of the content application 308 with coordinates of the graphic assets in the atlas(es) 316. The coordinates may designate locations of the graphic assets within the atlas(es) 316. The content application 308 may provide the coordinates to allow a client application 322 (e.g.: a browser game) to locate the graphic assets in the atlas(es) 316 and render the graphic assets that may be embedded in the code of the content application 308.

According to some embodiments, the hardware determination module 314 may be configured to interact with the client device 320. The hardware determination module 314 may interact with the client application 322 or another application executed by the client device 320, such as an operating system. The hardware determination module 314 may query the client device 320 to determine a video configuration of the client device 320. The video configuration may include video hardware information, such as a screen size, a window size of the client application 322, a memory size, and a GPU capacity of the video hardware, of the client device 320. Alternatively, the hardware determination module 314 may query the device hardware data store 304 with an identifier information retrieved from the client device 320. The identifier information may include make and model of the video hardware of the client device 320.

The video configuration may be used during a match operation to determine graphic assets to combine in the atlas(es) 316. The match operation may determine a size of each of the atlas(es) 316. The size of the atlas(es) may be configured based on the video configuration. The atlas generation module 312 may combine a subset of the graphic assets within each of the atlas(es) 316 in which a total size of the subset may be under or equal to a size of each of the atlas(es) 316. In addition, the size of each of the atlas(es) may be varied based on one or more differences of the video configuration. In an example scenario, in response to a determination of an increase or a decrease in an available memory size of a video hardware of the client device 320, the size of the atlas(es) 316 may be reduced or increased based on the available memory size.

Additionally, a master atlas may be retrieved from the master atlas data store 306 to generate the atlas(es) 316. The master atlas may also be referred to as an atlas primitive. The server 302 may transmit the atlas(es) 316 to the client device 320 after storing the graphic assets in the atlas(es) 316 based on the video configuration of the video hardware of the client device 320.

According to other embodiments, the master atlas may be stored in a decomposed form. An example of a decomposed form may include a quad tree data structure. A quad tree data structure may be composed of nodes. Each node may be part of a sub-structure of the quad tree such as a leaf or a branch.

The atlas generation module 312 may assign the graphic assets into nodes of a quad tree data structure of a master atlas. One of the graphic assets may be assigned to one of the nodes of the quad tree data structure. Coordinates of the graphics assets may be combined at sub-atlases within the quad tree data structure. The sub-atlases may correspond to a sub-structure of the quad tree data structure. The sub-structure may include a branch and a leaf of the quad tree data structure.

In an example scenario, the atlas generation module 312 may evaluate a size of a graphic asset. The atlas generation module 312 may determine the size of the graphic asset to exceed a threshold size. The threshold size may be an automatically or a manually configurable value. The atlas generation module 312 may partition the graphic into parts. Each part may be placed into contiguous nodes in the quad tree data structure. The contiguous nodes may be part of a sub-atlas within the quad tree data structure.

According to other embodiments, the atlas generation module 312 may generate the atlas(es) 316 from the sub-atlases of the quad tree data structure of the decomposed master atlas. The nodes of the quad tree data structure may store the graphic assets. The atlas generation module 312 may execute one or more operations to add a subset of the sub-atlases into each of the atlas(es) 316 based on the video configuration. In an example scenario, a size of each of the atlas(es) 316 may be determined based on the video configuration during a match operation. The atlas generation module 312 may execute concatenation operations to add sub-atlases from the quad tree data structure to atlas(es) 316 to fill the atlas(es) 316 with sub-atlases from the quad tree data structure. The atlas generation module 312 may monitor a remaining space in the atlas(es) 316 during the concatenation operations to not exceed the size of the atlas(es) 316 during storage of the sub-atlases in the atlas(es) 316. The atlas generation module 312 may continue execution of the concatenation operations until the sub-atlases from the quad tree may be stored in the atlas(es) 316. Subsequently, the atlas(es) 316 may be transmitted to the client application 322 to allow the client application 322 to render the graphic assets through the content application 308.

A code of the content application 308 may be modified by the code modification module 310 to replace the references in the content application 308 to the graphic assets with coordinates that designate locations of the graphic assets within the atlas(es) 316. The code may be modified to allow the content application 308 to locate the graphic assets within the atlas(es) 316 to render the graphic assets through the client application 322. The coordinates may be stored in an array of tuples. Each of the tuples may include a set of the coordinates and an asset identifier associated with each of the graphic assets.

According to some embodiments, a script may be used by the server 302 to populate a quad tree data structure in generation of the atlas(es) 316 from the graphic assets through use of coordinates to designate locations of the graphic assets in the atlas(es) 316. An example script may include:

```
class QuadTree
{
    // Axis-aligned bounding box stored as a center with half-dimensions
    // to represent the boundaries of this quad tree
    AABB boundary;
    // Points in this quad tree node
    Array of XY points;
    QuadTree* northWest;
    QuadTree* northEast;
    QuadTree* southWest;
    QuadTree* southEast;
    // Asset coordinations
    Array of MN tuples;
    // Each tuple is a coordinate pair and a reference to a subunit at that location
    // Methods
    function ___construct(AABB _boundary) {...}
    function insert(XY p) {...}
    function subdivide( ) {...} // create four children which fully divide this quad into four quads of equal area
    function queryRange(AABB range) {...}
}
```

Although a master atlas with a quad tree data structure is provided as an example of an embodiment, other data structures may be used as a decomposed master atlas.

According to other embodiments, a content server 303 may be allowed to provide the content application 308. The server 302 may communicate with the content server 303 to modify a code of the content application 308 to replace references to graphic assets with coordinates of graphic assets in the atlas(es) 316. In an example scenario, the content server 303 may receive a request for graphic assets from the client application 322. The content server 303 may transmit the request to the server 302. The server 302 may perform above stated actions to generate the atlas(es) 316 from the graphic assets. The server 302 may modify the code of the content application 308 to replace references to the graphic assets with the coordinates of the graphic assets in the atlas(es) 316. The server 302 may transmit the code and the atlas(es) 316 to the content server 303. The content server 303 may be allowed to integrate the code into the content application 308 and provide the content application 308 to the client application 322. The content server 303 may be allowed to transmit the atlas(es) 316 to the client application 322 to allow the client application 322 to render the content application 308 with graphic assets within the atlas(es) 316.

The examples in FIGS. 1 through 3 have been described using specific systems and processes in which generation of one or more atlases based on a video configuration of a client may be implemented. Embodiments for generation of the atlases based on the video configuration of the client are not limited to the systems and processes according to these examples.

Figure 4:
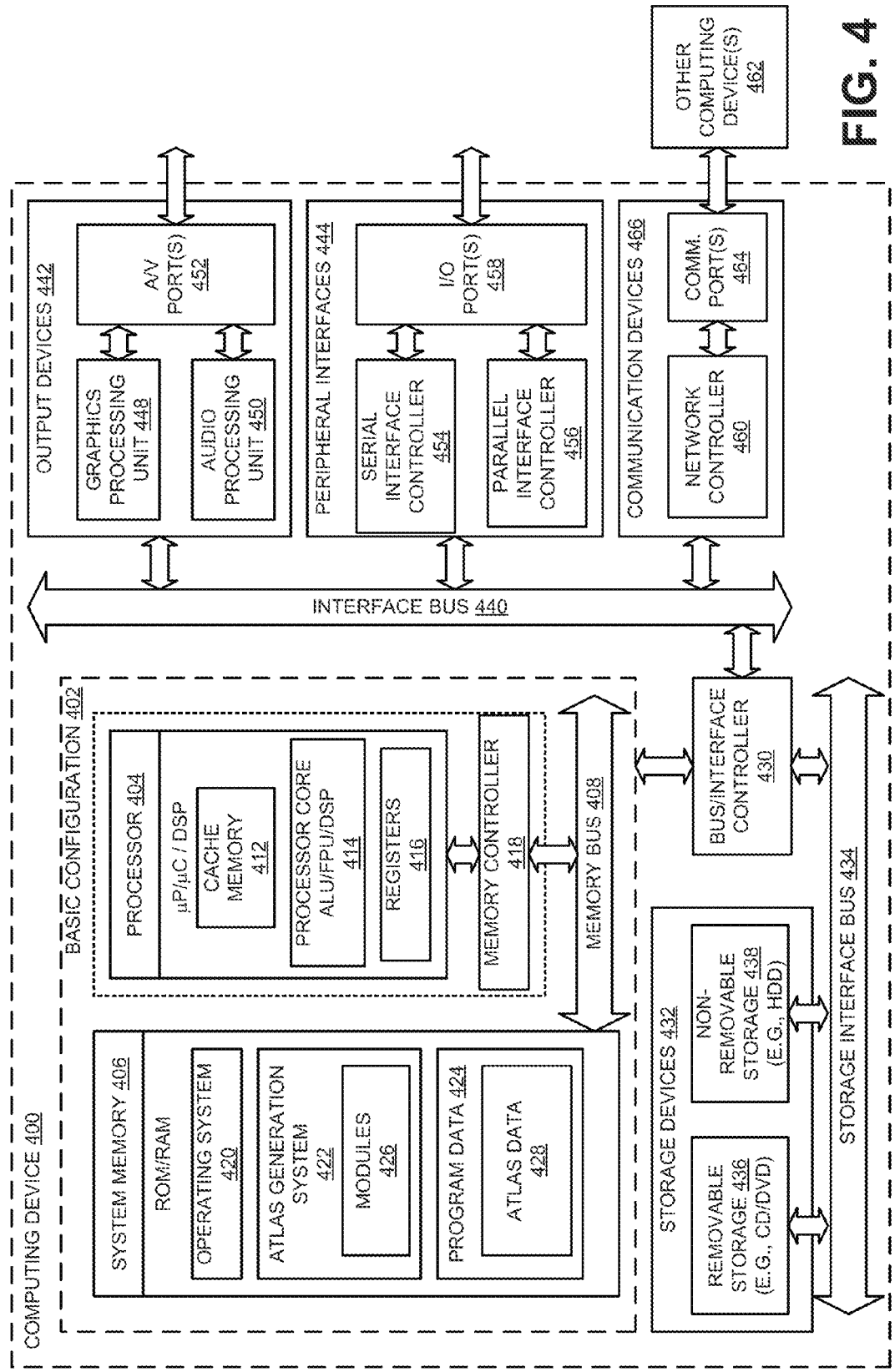
FIG. 4 illustrates a general purpose computing device, which may be used to generate one or more atlases based on a video configuration of a client.

FIG. 4 illustrates a general purpose computing device, which may be used to generate one or more atlases based on a video configuration of a client, arranged in accordance with at least some embodiments disclosed herein.

For example, a computing device 400 may be used to provide computer program products related to generation of one or more atlases based on a video configuration of a client. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, an atlas generation system 422, and program data 424. The atlas generation system 422 may include modules 426, including the hardware determination module 314, the atlas generation module 312, and the code modification module 310. The program data 424 may include, among other data, atlas data 428 associated with one or more graphic assets hosted by the server 302, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disc (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436, and the non-removable storage devices 438 may be examples of computer storage media. Computer storage media may include, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 may include a graphics processing unit 448 and an audio processing unit 450, which may be configured to communicate to various external devices, such as a display or speakers via one or more A/V ports 452. One or more example peripheral interfaces 444 may include a serial interface controller 454 or a parallel interface controller 456, which may be configured to communicate with external devices, such as input devices (for example, keyboard, mouse, pen, voice input device, touch input device, etc.) or other peripheral devices (for example, printer, scanner, etc.) via one or more I/O ports 458. An example communication device 466 may include a network controller 460, which may be arranged to facilitate communications with one or more other computing devices 462 over a network communication link via one or more communication ports 464. The one or more other computing devices 462 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 400 may be implemented as a part of a general purpose or specialized server, mainframe, or similar computer, which includes any of the above functions. The computing device 400 may also be implemented as a personal computer including both laptop computer and non-laptop computer configurations.

Example embodiments may also include methods for generating an atlas based on a video configuration of a client. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 5:
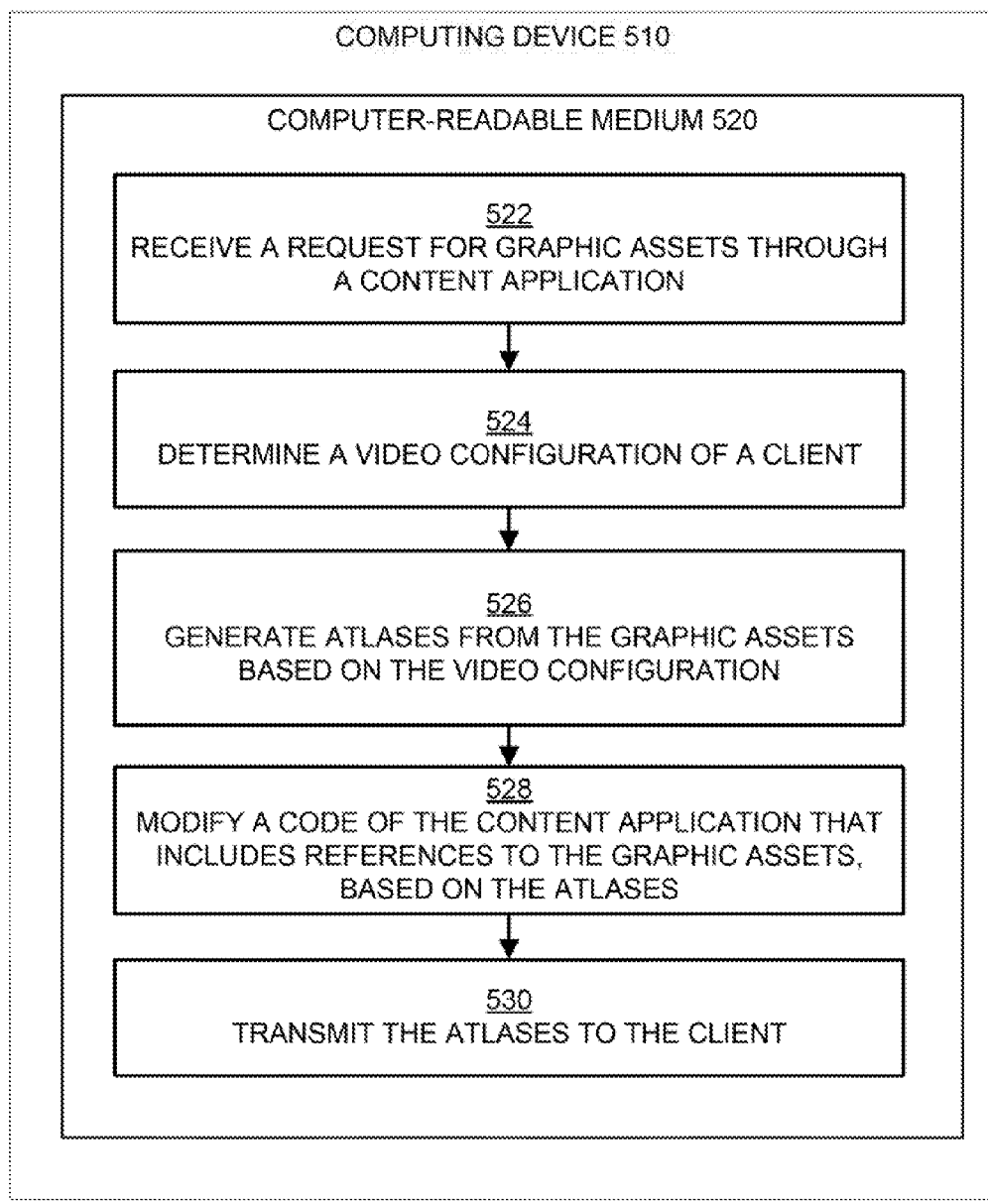
FIG. 5 is a flow diagram illustrating an example method to generate one or more atlases based on a video configuration of a client.

FIG. 5 is a flow diagram illustrating an example method to generate one or more atlases based on a video configuration of a client that may be performed by a computing device such as the computing device 400 in FIG. 4, arranged in accordance with at least some embodiments described herein.

Example methods may include one or more operations, functions, or actions as illustrated by one or more of blocks 522, 524, 526, 528, and 530, and may, in some embodiments, be performed by a computing device such as the computing device 400 in FIG. 4. The operations described in the blocks 522-530 may also be stored as computer-executable instructions in a computer-readable medium such as a computer-readable medium 520 of a computing device 510.

An example process for generating an atlas based on a video configuration of a client may begin with block 522, "RECEIVE A REQUEST FOR GRAPHIC ASSETS THROUGH A CONTENT APPLICATION," where the server 102 may receive a request for the graphic assets (204, 206, 208, and 210) from the client device 104.

Block 522 may be followed by block 524, "DETERMINE A VIDEO CONFIGURATION OF THE CLIENT," where determining the video configuration of the client device 104 may include querying the client device 104 for the video configuration and receiving a memory size of the video hardware of the client device 104, a GPU capacity, a screen size, or a window size of a client application that may be executed on the client device 104, as the video configuration.

Block 524 may be followed by block 526, "GENERATE THE ATLASES FROM THE GRAPHIC ASSETS BASED ON THE VIDEO CONFIGURATION," where the graphic assets may be stored in the atlases to not exceed a size of each of the atlases.

Block 526 may be followed by block 528, "MODIFY A CODE OF THE CONTENT APPLICATION THAT INCLUDES REFERENCES TO THE GRAPHIC ASSETS, BASED ON THE ATLASES," where references to the graphic assets in the code may be replaced by coordinates that designate locations of the graphic assets in the atlases.

Block 528 may be followed by block 530, "TRANSMIT THE ATLASES TO THE CLIENT," where the server 102 may transmit the atlases to the client device 104 to allow the client device 104 to render the graphic assets stored in the atlases.

Figure 6:
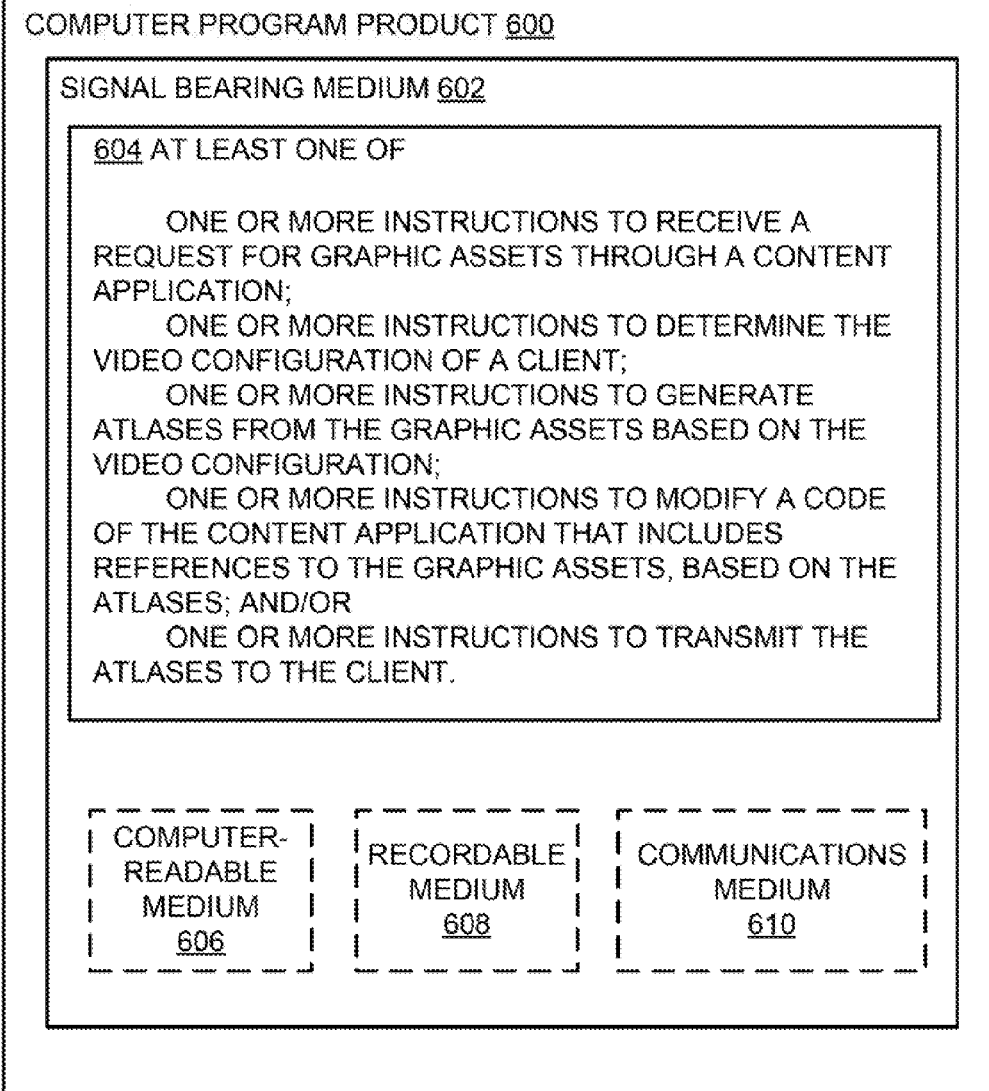
FIG. 6 illustrates a block diagram of an example computer program product to generate one or more atlases based on a video configuration of a client, all arranged in accordance with at least some embodiments described herein.

FIG. 6 illustrates a block diagram of an example computer program product to generate one or more atlases based on a video configuration of a client, arranged in accordance with at least some embodiments described herein.

In some examples, as shown in FIG. 6, a computer program product 600 may include a signal bearing medium 602 that may also include one or more machine readable instructions 604 that, when executed by, for example, a processor, may provide the functionality described herein. For example, referring to the processor 404 in FIG. 4, the atlas generation system 422 and the modules 426 may undertake one or more of the tasks shown in FIG. 6 in response to the instructions 604 conveyed to the processor 404 by the signal bearing medium 602 to generate one or more atlases based on a video configuration of the client, as described herein. Some of those instructions may include, for example, receiving a request for graphic assets through a content application, from the client, determining the video configuration of the client, generating the atlases from the graphic assets based on the video configuration, modifying a code of the content application that includes references to the graphic assets, based on the atlases, and transmitting the atlases to the client, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). For example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, a method is provided to generate one or more atlases based on a video configuration of a client. The method may include receiving a request for graphic assets through a content application, determining the video configuration of the client, generating the atlases from the graphic assets based on the video configuration, modifying a code of the content application that includes references to the graphic assets, based on the atlases, and transmitting the atlases to the client.

According to other examples, determining the video configuration of the client may include querying the client for the video configuration, and receiving one or more from a set of: a memory size and a graphic processor capacity of a video hardware of the client as the video configuration. Determining the video configuration of the client may also include querying the client for the video configuration, receiving an identifier associated with a make and a model of a video hardware of the client, querying a data store configured to manage video hardware information with the identifier, and receiving one or more from a set of: a memory size and a graphic processor capacity of the video hardware of the client as the video configuration from the data store. Determining the video configuration of the client may further include querying the client for a screen size of the client or a window size of a client application that executes on the client, receiving the screen size or the window size from the client, estimating a memory size of a video hardware of the client based on the received screen size or the window size, and including the memory size in the video configuration.

According to further examples, the method may further include determining a size of each one of the atlases through a match operation that determines the size from the video configuration. The atlases may be generated from a master atlas that is in a decomposed form. The graphics assets may be assigned to nodes of a quad tree data structure of a master atlas and coordinates of the graphics assets may be stored at sub-atlases within the quad tree data structure, wherein each one of the sub-atlases correspond to a sub-structure of the quad tree data structure that includes a branch or a leaf of the quad tree data structure.

According to yet further examples, the method may further include partitioning one of the graphic assets into parts in response to a determination that a size of the graphic asset is above a threshold size and placing the parts into contiguous nodes in the quad tree data structure. Each one of the atlases may be generated from the sub-atlases based on the video configuration through concatenation operations that add a subset of the sub-atlases into each one of the atlases. The coordinates may be stored in an array of tuples and in each one of the tuples a set of the coordinates and an asset identifier of one of the graphic assets may be included. The references to the graphic assets within the code of the content application may be replaced with the coordinates that designate locations of the graphic assets within the atlases.

According to some examples, a system is provided to generate one or more atlases based on a video configuration of a client. The system may include a first server communicatively coupled to a second server. The first server may be configured to receive a request for graphic assets, from the client and transmit the request to the second server. The second server may be configured to receive the request, determine the video configuration of the client, generate the atlases from a master atlas that is in a decomposed form that includes the graphic assets, based on the video configuration, retrieve a code of a content application of the first server that includes references to the graphic assets, modify the code based on the atlases, and transmit the atlases and the code to the first server. The first server may be further configured to receive the code and the atlases, provide the content application that includes the code to the client, and transmit the atlases to the client.

According to other examples, the second server may be further configured to query the client for the video configuration and receive one or more from a set of: a memory size and a graphic processor capacity of a video hardware of the client as the video configuration. The client may be queried for the video configuration, an identifier associated with a make and a model of a video hardware of the client may be received, a data store configured to manage video hardware information may be queried with the identifier, and one or more from a set of: a memory size and a graphic processor capacity of the video hardware of the client may be received as the video configuration from the data store. The client may be queried for a screen size of the client or a window size of a client application that executes in the client, the screen size or the window size may be received from the client, a memory size of a video hardware of the client may be estimated based on the received screen size or the window size, and the memory size may be included in the video configuration.

According to further examples, the second server may be further configured to determine a size of each one of the atlases through a match operation that determines the size from the video configuration, assign the graphics assets to nodes of a quad tree data structure of a master atlas, and store coordinates of the graphics assets at sub-atlases within the quad tree data structure, wherein each one of the sub-atlases correspond to a sub-structure of the quad tree data structure that includes a branch or a leaf of the quad tree data structure. One of the graphic assets may be partitioned into parts in response to a determination that a size of the graphic asset is above a threshold size and the parts may be placed into contiguous nodes in the quad tree data structure. Each one of the atlases from the sub-atlases may be generated based on the video configuration through concatenation operations that add a subset of the sub-atlases into each one of the atlases. The coordinates may be stored in an array of tuples and in each one of the tuples a set of the coordinates and an asset identifier of one of the graphic assets may be included. The references to the graphic assets within the code of the content application may be replaced with the coordinates that designate locations of the graphic assets within the atlases.

According to some embodiments, a system may be provided. the system may include a client device that includes a video module and a communication module and a server configured to communicate with the client device. The server may include a memory configured to store instructions associated with generation of one or more atlases based on a video configuration of the client device and a processor coupled to the memory. The processor may be configured to receive a request for graphic assets, from the client, determine the video configuration of the client, determine a size of each one of the atlases through a match operation that determines the size from the video configuration, generate the atlases from a master atlas that is in a decomposed form that includes the graphic assets, modify a code of a content application that includes references to the graphic assets, based on the atlases, and transmit the atlases to the client.

According to other examples, the processor may be further configured to query the client device for the video configuration, receive an identifier associated with a make and a model of a video hardware of the client, query a data store configured to manage video hardware information with the identifier, and receive one or more from a set of: a memory size and a graphic processor capacity of the video hardware of the client device as the video configuration from the data store. The processor may be further configured to assign the graphics assets to nodes of a quad tree data structure of a master atlas, store coordinates of the graphics assets at sub-atlases within the quad tree data structure, wherein each one of the sub-atlases correspond to a sub-structure of the quad tree data structure that includes a branch or a leaf of the quad tree data structure, and generate each one of the atlases from the sub-atlases based on the video configuration through concatenation operations that add a subset of the sub-atlases into each one of the atlases.

According to further examples, the processor may be further configured to partition one of the graphic assets into parts in response to a determination that a size of the graphic asset is above a threshold size and place the parts into contiguous nodes in the quad tree data structure. The coordinates may be stored in an array of tuples and in each one of the tuples a set of the coordinates and an asset identifier of one of the graphic assets may be included. The references to the graphic assets within the code of the content application may be replaced with the coordinates that designate locations of the graphic assets within the atlases.

According to some examples, a computer-readable storage medium may be provided with instructions stored to generate one or more atlases based on a video configuration of a client. The instructions, in response to execution by a processor, may cause the processor to receive a request for graphic assets, from the client, determine the video configuration of the client, determine a size of each one of the atlases through a match operation that determines the size from the video configuration, generate the atlases from a master atlas that is in a decomposed form that stores the graphic assets, modify a code of a content application that includes references to the graphic assets, based on the atlases, and transmit the atlases to the client.

According to other examples, the instructions may further cause the processor to query the client for the video configuration and receive one or more from a set of: a memory size and a graphic processor capacity of a video hardware of the client as the video configuration. The instructions may further cause the process to assign the graphics assets to nodes of a quad tree data structure of the master atlas, store coordinates of the graphics assets at sub-atlases within the quad tree data structure in an array of tuples, wherein each one of the sub-atlases correspond to a sub-structure of the quad tree data structure that includes a branch or a leaf of the quad tree data structure, include in each one of the tuples a set of the coordinates and an asset identifier of one of the graphic assets, and generate each one of the atlases from the sub-atlases based on the video configuration through concatenation operations that add a subset of the sub-atlases into each one of the atlases. The references to the graphic assets within the code of the content application may be replaced with the coordinates that designate locations of the graphic assets within the atlases.

The use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent techniques and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, the mechanisms of the subject matter described herein are capable of being distributed as a program product in a variety of forms, and an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented using any suitable commercially available components, such as those typically found in data computing/communication and/or network computing/communication systems. The herein described subject matter sometimes illustrates different components contained within, or connected with, different other components. Such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various compositions, techniques, systems, and devices are described in terms of "comprising" various components or steps (interpreted as meaning "including, but not limited to"), the compositions, techniques, systems, and devices can also "consist essentially of" or "consist of" the various components and steps, and such terminology should be interpreted as defining essentially closed-member groups.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to generate an atlas based on a video configuration of a client, the method comprising:
   receiving a request for graphic assets through a content application;
   determining the video configuration of the client;
   determining a size of the atlas through a match operation that determines the size from the video configuration;
   generating the atlas from the graphic assets based on the video configuration;
   modifying a code of the content application that includes references to the graphic assets, based on the atlas; and
   transmitting the atlas to the client.

2. The method of claim 1, wherein determining the video configuration of the client comprises:
   querying the client for the video configuration;
   receiving an identifier associated with a make and a model of a video hardware of the client;
   querying a data store configured to manage video hardware information with the identifier; and
   receiving one or more from a set of: a memory size and a graphic processor capacity of the video hardware of the client as the video configuration from the data store.

3. The method of claim 1, wherein determining the video configuration of the client comprises:
   querying the client for one of: a screen size of the client and a window size of a client application that executes on the client;
   receiving one of: the screen size and the window size from the client;
   estimating a memory size of a video hardware of the client based on one of: the received screen size and the window size; and
   including the memory size in the video configuration.

4. The method of claim 1, further comprising:
   generating the atlas from a master atlas that is in a decomposed form.

5. The method of claim 1, further comprising:
   assigning the graphics assets to nodes of a quad tree data structure of a master atlas; and
   storing coordinates of the graphics assets at a sub-atlas within the quad tree data structure, wherein the sub-atlas corresponds to a sub-structure of the quad tree data structure that includes one or more of: a branch of the quad tree data structure and a leaf of the quad tree data structure.

6. The method of claim 5, further comprising:
partitioning one of the graphic assets into parts in response to a determination that a size of the graphic assets is above a threshold size; and
placing the parts of one of the graphic assets into contiguous nodes in the quad tree data structure.

7. The method of claim 5, further comprising:
generating the atlas from the sub-atlas based on the video configuration through concatenation operations that add a subset of the sub-atlas into the atlas.

8. The method of claim 5, further comprising:
storing the coordinates in an array of tuples; and
including in each one of the tuples a set of the coordinates and an asset identifier of one of the graphic assets.

9. A system to generate an atlas based on a video configuration of a client, the system comprising:
a first server communicatively coupled to a second server, wherein the first server is configured to:
receive a request for graphic assets, from the client; and
transmit the request to the second server;
the second server is configured to:
receive the request;
determine the video configuration of the client;
generate the atlas from a master atlas that is in a decomposed form that includes the graphic assets, based on the video configuration;
retrieve a code of a content application of the first server that includes references to the graphic assets;
modify the code by:
assigning the graphic assets to nodes of a quad tree data structure of the master atlas; and
storing coordinates of the graphic assets at a sub-atlas within the quad tree data structure, wherein the sub-atlas corresponds to a sub-structure of the quad tree data structure that includes one or more of: a branch of the quad tree data structure and a leaf of the quad tree data structure;
transmit the atlas and the code to the first server; and
the first server is further configured to:
receive the code and the atlas;
provide the content application that includes the code to the client; and
transmit the atlas to the client.

10. The system according to claim 9, wherein the second server is further configured to:
query the client for the video configuration;
receive an identifier associated with a make and a model of a video hardware of the client;
query a data store configured to manage video hardware information with the identifier; and
receive one or more from a set of: a memory size and a graphic processor capacity of the video hardware of the client as the video configuration from the data store.

11. The system according to claim 9, wherein the second server is further configured to:
query the client for one of: a screen size of the client and a window size of a client application that executes in the client;
receive one of: the screen size and the window size from the client;
estimate a memory size of a video hardware of the client based on the received screen size or the window size; and
include the memory size in the video configuration.

12. The system according to claim 9, wherein the second server is further configured to:
determine a size of the atlas through a match operation that determines the size from the video configuration.

13. The system according to claim 9, wherein the second server is further configured to:
generate the atlas from the sub-atlas based on the video configuration through concatenation operations that add a subset of the sub-atlas into the atlas.

14. The system according to claim 9, wherein the second server is further configured to:
store the coordinates in an array of tuples; and
include in each one of the tuples a set of the coordinates and an asset identifier of one of the graphic assets.

15. The system according to claim 9, wherein the second server is further configured to:
replace the references to the graphic assets within the code of the content application with the coordinates that designate locations of the graphic assets within the atlas.

16. A system comprising:
a client device that includes a video module and a communication module;
a server configured to communicate with the client device, the server comprising a memory configured to store instructions associated with generation of an atlas based on a video configuration of the client device and a processor coupled to the memory, wherein the processor is configured to:
receive a request for graphic assets, from the client;
determine the video configuration of the client;
determine a size of the atlas through a match operation that determines the size from the video configuration;
generate the atlas from a master atlas that is in a decomposed form that includes the graphic assets;
modify a code of a content application that includes references to the graphic assets, based on the atlas by:
assigning the graphic assets to nodes of a quad tree data structure of the master atlas; and
storing coordinates of the graphic assets at the sub-atlas within the quad tree data structure, wherein the sub-atlas corresponds to a sub-structure of the quad tree data structure that includes one or more of: a branch of the quad tree data structure and a leaf of the quad tree data structure; and
transmit the atlas to the client.

17. The system according to claim 16, wherein the processor is further configured to:
query the client device for the video configuration;
receive an identifier associated with a make and a model of a video hardware of the client;
query a data store configured to manage video hardware information with the identifier; and
receive one or more from a set of: a memory size and a graphic processor capacity of the video hardware of the client device as the video configuration from the data store.

18. The system according to claim 16, wherein the processor is further configured to:
partition one of the graphic assets into parts in response to a determination that a size of the graphic assets is above a threshold size; and
place the parts of the graphic assets into contiguous nodes in the quad tree data structure.

19. The system according to claim 16, wherein the processor is further configured to:
store the coordinates in an array of tuples; and include in each one of the tuples a set of the coordinates and an asset identifier of one of the graphic assets.

20. The system according to claim 16, wherein the processor is further configured to:

replace the references to the graphic assets within the code of the content application with the coordinates that designate locations of the graphic assets within the atlas.

* * * * *